(12) United States Patent
Toth et al.

(10) Patent No.: US 8,524,139 B2
(45) Date of Patent: Sep. 3, 2013

(54) GAS-ASSISTED LASER ABLATION

(75) Inventors: Milos Toth, Portland, OR (US); Marcus Straw, Portland, OR (US)

(73) Assignee: FEI Compay, Hillsboro, OR (US)

( * ) Notice: Subject to any disclaimer, the term of this patent is extended or adjusted under 35 U.S.C. 154(b) by 156 days.

(21) Appl. No.: 12/828,243

(22) Filed: Jun. 30, 2010

(65) Prior Publication Data
US 2011/0031655 A1 Feb. 10, 2011

Related U.S. Application Data

(60) Provisional application No. 61/232,780, filed on Aug. 10, 2009.

(51) Int. Cl.
*B29C 35/08* (2006.01)
(52) U.S. Cl.
USPC ............ 264/400; 264/82; 264/83; 264/101; 264/102; 219/121.6; 219/121.61; 219/121.62; 219/121.73
(58) Field of Classification Search
USPC ............................ 264/82, 83, 101, 102, 400; 219/121.6–121.62, 121.73
See application file for complete search history.

(56) References Cited

U.S. PATENT DOCUMENTS

| | | | |
|---|---|---|---|
| 3,866,398 A * | 2/1975 | Vernon et al. | ............... 134/1.3 |
| 4,114,018 A | 9/1978 | Von Allmen et al. | |
| 5,322,988 A * | 6/1994 | Russell et al. | ........... 219/121.69 |
| 5,354,420 A * | 10/1994 | Russell et al. | ................ 438/708 |
| 5,496,985 A | 3/1996 | Foltz et al. | |
| 5,780,806 A | 7/1998 | Ferguson et al. | |
| 5,874,011 A | 2/1999 | Ehrlich | |
| 6,331,690 B1 * | 12/2001 | Yudasaka et al. | .......... 219/121.6 |
| RE37,585 E | 3/2002 | Mourou et al. | |
| 6,540,952 B2 | 4/2003 | LaPoint et al. | |
| 6,617,541 B1 | 9/2003 | Wadman et al. | |

(Continued)

FOREIGN PATENT DOCUMENTS

| | | |
|---|---|---|
| JP | 59104287 | 6/1984 |
| WO | W09738355 | 10/1997 |

(Continued)

OTHER PUBLICATIONS

Harriot, Lloyd, 'Focused-Ion-Beam-Induced Gas Etching,' Japanese Journal of Applied Physics, Dec. 1994, pp. 7094-7098, vol. 33.

(Continued)

*Primary Examiner* — Monica Huson
*Assistant Examiner* — Saeed Huda
(74) *Attorney, Agent, or Firm* — Scheinberg & Associates, PC; Michael O. Scheinberg; Ki O

(57) ABSTRACT

An improved method for laser processing that prevents material redeposition during laser ablation but allows material to be removed at a high rate. In a preferred embodiment, laser ablation is performed in a chamber filled with high pressure precursor (etchant) gas so that sample particles ejected during laser ablation will react with the precursor gas in the gas atmosphere of the sample chamber. When the ejected particles collide with precursor gas particles, the precursor is dissociated, forming a reactive component that binds the ablated material. In turn, the reaction between the reactive dissociation by-product and the ablated material forms a new, volatile compound that can be pumped away in a gaseous state rather than redepositing onto the sample.

21 Claims, 6 Drawing Sheets

(56) References Cited

U.S. PATENT DOCUMENTS

| | | | |
|---|---|---|---|
| 6,627,846 B1* | 9/2003 | Yogev et al. | 219/121.85 |
| 6,664,498 B2 | 12/2003 | Forsman et al. | |
| 6,753,538 B2* | 6/2004 | Musil et al. | 250/492.2 |
| 6,900,447 B2 | 5/2005 | Gerlach et al. | |
| RE39,001 E | 3/2006 | Lundquist et al. | |
| 7,223,674 B2 | 5/2007 | Baluswamy et al. | |
| 7,504,182 B2 | 3/2009 | Stewart et al. | |
| 8,168,961 B2 | 5/2012 | Straw et al. | |
| 2003/0071020 A1* | 4/2003 | Hong et al. | 219/121.69 |
| 2003/0155328 A1* | 8/2003 | Huth et al. | 216/65 |
| 2005/0250292 A1* | 11/2005 | Baluswamy et al. | 438/401 |
| 2006/0226118 A1 | 10/2006 | Baluswamy et al. | |
| 2008/0241425 A1* | 10/2008 | Li et al. | 427/596 |
| 2009/0239042 A1* | 9/2009 | Jain et al. | 428/195.1 |
| 2009/0309018 A1 | 12/2009 | Smith et al. | |
| 2010/0127190 A1 | 5/2010 | Straw et al. | |
| 2010/0197142 A1 | 8/2010 | Randolph et al. | |
| 2010/0224592 A1 | 9/2010 | Toth et al. | |
| 2010/0301013 A1* | 12/2010 | Conneely et al. | 216/83 |
| 2011/0115129 A1 | 5/2011 | Straw et al. | |
| 2011/0163068 A1 | 7/2011 | Utlaut et al. | |
| 2012/0103945 A1 | 5/2012 | Straw et al. | |

FOREIGN PATENT DOCUMENTS

| | | |
|---|---|---|
| WO | 2008098084 | 8/2008 |
| WO | 2009089499 | 7/2009 |
| WO | 2010006067 | 1/2010 |
| WO | 2010006188 | 1/2010 |

OTHER PUBLICATIONS

Lazare, Sylvain, et al., 'Ultraviolet Laser Photoablation of Polymers: A Review and Recent Results,' Laser Chem., 1989, pp. 25-40, vol. 10.

Sun, J., et al., 'Inert Gas Beam Delivery for Ultrafast Laser Micromachining at Ambient Pressure ,' Journal of Applied Physics, Jun. 15, 2001, pp. 8219-8224, vol. 89, Iss. 12.

Tang, Mingzhen, et al., 'Self-Assembly of Tunable and Highly Uniform Tungsten Nanogratings Induced by a Femtosecond Laser with Nanojoule Energy,' Nanotechnology, 2007, 5 pgs, vol. 18.

Debarre D., et al., 'The Role of Gas-Phase in the Laser Etching of Cu by CCl4,' Applied Surface Science, 1996, pp. 453-456, vol. 96-98.

Downer, M.C., et al., 'Femtosecond Imaging of Melting and Evaporation at a Photoexcited Silicon Surface,' Journal of the Optical Society of America B, Apr. 1985, pp. 595-599, vol. 2, No. 4.

Harilal, S.S., et al., 'Ion Debris Mitigation from Tin Plasma Using Ambient Gas, Magnetic Field and Combined Effects,' Applied Physics B: Lasers and Optics, 2007, pp. 547-553, vol. 86.

Her, T.-H., et al., 'Femtosecond Laser-Induced Formation of Spikes on Silicon,' Applied Physics A: Materials Science and Processing, Mar. 2000, pp. 383-385, vol. 70.

Isaac, R.C., et al., 'Prompt Electron Emission and Collisional Ionization of Ambient Gas During Pulsed Laser Ablation of Silver,' Applied Physics A: Materials Science and Processing, 1998, pp. 557-561, vol. 67.

Leboeuf, J.N., et al., 'Modeling of Dynamical Processes in Laser Ablation,' Applied Surface Science, 1996, pp. 14-23, vol. 96-98.

Nayak, Barada K., et al., 'Spontaneous Formation of Nanospiked Microstructures in Germanium by Femtosecond Laser Irradiation,' Nanotechnology, Apr. 17, 2007, pp. 195302-195305, vol. 18.

Perrie, W., et al., 'Femtosecond Laser Micro-Structuring of Aluminum Under Helium,' Applied Surface Science, Mar. 25, 2004, pp. 50-59, vol. 230.

Randolph, S.J., et al., 'Focused, Nanoscale Electron-Beam-Induced Deposition and Etching,' Solid State and Materials Sciences, 2006, pp. 55-89, vol. 31.

Riedel, D. et al., 'Fabrication of Ordered Arrays of Silicon Cones by Optical Diffraction in Ultrafast Laser Etching with SF6,' Applied Physics A: Materials Science and Processing, 2004, pp. 381-385, vol. 78.

Bozso, F., et al., 'Electronic Excitation-Induced Surface Chemistry and Electron-Beam-Assisted Chemical Vapor Deposition,' Mat. Res. Soc. Symp. Proc., 1990, pp. 201-209, vol. 158.

Senadheera, Sid, et al., 'Critical Time to Nucleation: Graphite and Silicon Nanoparticle Generation by Laser Ablation,' Journal of Nanotechnology, 2009, 6 pgs, vol. 2009.

Toth, Milos, et al., 'Nanostructure Fabricated by Ultra-High-Resolution Environmental Scanning Electron Microscopy,' Nano Letters, 2007, pp. 525-530, vol. 7, No. 2.

Young, R.J., et al., 'Characteristics of Gas-Assisted Focused Ion Beam Etching,' J. Vac. Sci., Technol. B, Mar./Apr. 1993, pp. 234-241, vol. 11, No. 2.

Aliouchouche, A., et al., 'Laser Etching of Silicon by Chlorine: Effect of Post-Desorption Collisions and Chlorine In-Diffusion on the Laser Desorption Yield,' Applied Surface Science, 1993. pp. 52-58, vol. 69.

Amoruso, S., et al., 'Propagation of a Femtosecond Pulsed Laser Ablation Plume into a Background Atmosphere,' Applied Physics Letters, 2008, 4 pgs, vol. 92.

Amoruso, S., et a., 'Generation of Silicon Nanoparticles Via Femtosecond Laser Ablation in Vacuum,' Applied Physics Letters, May 31, 2004, pp. 4502-4504, vol. 84, No. 22.

Bleiner, David, et al., 'Stopping Power of a Buffer Gas for Laser Plasma Debris Mitigation,' Journal of Applied Physics, 2009, 5 pgs, vol. 106.

Boulmer, J., et al., 'Time of Flight Study of Low Pressure Laser Etching of Silicon by Chlorine,' Applied Surface Science, 1989, pp. 424-431.

Cronberg, H., et al., 'Effects of Inverse Bremsstrahlung in Laser-Induced Plasmas from Graphite Surface,' Applied Phyics B, 1991, pp. 155-157, vol. 52.

Harilal, S.S., et al., 'Internal Structure and Expansion Dynamics of Laser Ablation Plumes into Ambient Gases,' Journal of Applied Physics, Mar. 1, 2003, pp. 2380-2388, vol. 93, No. 5.

Harilal, S.S., et al., 'Ambient Gas Effects on the Dynamics of Laser-Produced Tin Plume Expansion,' Journal of Applied Physics, 2006, 11 pgs, vol. 99.

Leboeuf, J.N., et al., 'Modeling of Plume Dynamics in Laser Ablation Processes for Thin Film Deposition of Materials,' Phys. Plasmas, May 1996, pp. 2203-2209, vol. 3, No. 5.

Li, Juntao, et al., 'Evolution of the Nanostructure of Deposits Grown by Electron Beam Induced Deposition,' Applied Physics Letters, 2008, 3 pgs, vol. 93.

Lobo, Charlene J., et al., 'High Resolution Radially Symmetric Nanostructures From Simultaneous Electron Beam Induced Etching and Deposition,' Nanotechnology, 2008, 6 pgs, vol. 19.

Ritsko, J.J., et al., 'Laser-Assisted Chemical Etching of Copper,' Appl. Phys. Lett., Jul. 4, 1988, pp. 78-80, vol. 53, No. 1.

Ritsko, John J., 'Laser Etching,' Laser Microfabrication: Thin Film Processes and Lithography, 1989, 28 pgs.

Soer, Wouter, et al., 'Debris Mitigation for EUV Sources Using Directional Gas Flows,' Proc. of SPIE, 2006, 6 pgs, vol. 6151.

Utke, Ivo, et al., 'Gas-Assisted Focused Electron Beam and Ion Beam Processing and Fabrication,' J. Vac. Sci. Technol. B., Jul./Aug. 2008, pp. 1197-1276, vol. 26, No. 4.

Ehrlich, Daniel, et al., 'Laser Etching for Flip-Chip De-Bug and Inverse Stereolithography for MEMS,' Solid State Technology, Jun. 2001, pp. 145-150.

Guo, Hongping, et al., 'Study of Gas-Stream-Assisted Laser Ablation of Copper,' Thin Solid Films, 1992, pp. 274-276.

Robinson, G.M., et al., 'Femtosecond Laser Micromachining of Aluminum Surfaces Under Controlled Gas Atmospheres,' Journal of Materials Engineering and Performance, Apr. 2006, pp. 155-160, vol. 15, Iss. 2.

Ehrlich, Daniel, et al., 'Laser Chemical Technique for Rapid Direct Writing of Surface Relief in Silicon,' American Institute of Physics, Jun. 15, 1981, pp. 1018-1020, vol. 38, Iss. 12.

Oostra, D.J. et al., 'Chemical Sputtering by Ions, Electrons and Photons,' Nuclear Instruments and Methods in Physics Research, 1987, pp. 618-624, vol. B18.

* cited by examiner

GAS-ASSISTED LASER ABLATION

This application claims priority from U.S. Provisional Application 61/232,780, filed Aug. 10, 2009, which is hereby incorporated by reference.

TECHNICAL FIELD OF THE INVENTION

The present invention relates generally to fabricating microstructures by laser micromachining, and more particularly, to laser micromachining using an etchant gas.

BACKGROUND OF THE INVENTION

Removing material from a substrate to form microscopic or nanoscopic structures is referred to as micromachining, milling, or etching. Lasers beams and charged particle beams are two particular technologies used for micromachining. Each has advantages and limitations in various applications.

Laser systems use several different mechanisms for micromachining. In some processes, the laser is used to supply heat to a substrate to induce a chemical reaction. The reaction occurs only in the heated areas. The heat tends to diffuse to an area larger than the laser beam spot, making the resolution of the process poorer than the laser spot size and causing concomitant thermal damage to nearby structures. Another mechanism used in laser micromachining is photochemical etching, in which the laser energy is absorbed by individual atoms or molecules (particles) of the substrate, exciting them into a state in which they can chemically react with an etchant. Photochemical etching is limited to materials that are photochemically active. Another mechanism used in laser machining is laser ablation, in which energy supplied rapidly to a small volume causes atoms to be explosively expelled from the substrate. Laser ablation using an ultrashort pulsed laser (UPL) is described, for example, in U.S. Re. 37,585 to Mourou for "Method for Controlling Configuration of Laser Induced Breakdown and Ablation." UPL ablation (UPLA) overcomes some of the limitations of the processes described above.

Charged particle beams include ion beams and electron beams. Ions in a focused beam typically have sufficient momentum to micromachine by physically ejecting material from a surface. Because electrons are much lighter than ions, electron beams are typically limited to removing material by inducing a chemical reaction between an etchant vapor and the substrate. Ions beams typically are generated from a liquid metal ion source or by a plasma ion source. The spot size of a charged particle beam depends on many factors, including the type of particles and the current in the beam. A beam with low current can typically be focused to a smaller spot and therefore produce a smaller structure than a beam with high current, but a low current beam takes longer to micromachine a structure than a high current beam.

Lasers are typically capable of supplying energy to a substrate at a much higher rate than charged particle beams, and so lasers typically have much higher material removal rates than charged particle beams. FIG. 1 is a schematic illustration of a prior art laser ablating a surface. When a high power pulsed laser 102 producing beam 103 is focused onto a target material 104 and the laser fluence exceeds the ablation threshold of the material, chemical bonds in the target material are broken and the material is fractured into energetic fragments, typically a mixture of neutral atoms, ions, clusters, and nano- and micro-particles creating a plasma plume 106 above the material surface. Since the material leaves the reaction zone as an energetic plasma, gas, and solid debris mixture, the ablation process resembles explosive evaporation of the material which propels material fragments up and away from the point where the laser is focused. As the plasma cools, much of the solid debris 108 is redeposited on the workpiece surface, thus reducing the quality of the cut and decreasing the cutting efficiency since the debris must be removed again before the beam interacts with the workpiece surface.

Various techniques are known to minimize undesirable redeposition during laser ablation. For example, it is known to use an inert gas stream to cool the ablation site as described by Gua, Hongping et al. "Study of Gas-Stream Assisted Laser Ablation of Copper," 218 THIN SOLID FILMS, 274-276 (1992). U.S. Pat. No. 5,496,985 to Foltz et al. for "Laser Ablation Nozzle," describes the use of gas or fluid jets to remove ejected material from the vicinity of the cut to prevent redeposition in that area. Robinson, G. M. et al. "Femtosecond Laser Micromachining of Aluminum Surfaces Under Controlled Gas Atmospheres," J. Mater. Eng. & Perf., Vol. 15(2), 155-160 (April 2006) describe the use of an inert gas as an inert gas shield. Such secondary techniques are often not completely effective, and add significant complexity to the laser ablation system while decreasing cutting efficiency.

U.S. Pat. Pub. No. 2008/0241425 by Li et al. for "System and Method to Reduce Redeposition of Ablated Material," filed Oct. 2, 2008, describes a system where laser ablation is performed in a vacuum. According to Li, most laser ablation is performed in air (at normal atmospheric pressure) for low cost and convenience. Li teaches lowering the pressure in the sample chamber so that the ablated material will travel farther from the milling site before it loses a significant amount of kinetic energy and redeposits onto the surface. Unfortunately, even using the method described by Li, the material still redeposits onto the surface, some of it just travels farther away than it would at higher chamber pressure. Further, the low pressure system described by Li makes it more likely that the debris material will deposit onto various system components, such as lenses and pole pieces, as described below.

Like lasers, charged particle beam systems also have a problem with material redeposition. In order to prevent significant redeposition and increase the material removal rate, charged particle beam systems often make use of gas-assisted etching (GAE). In GAE, an etching gas (also referred to as a precursor gas) is directed at the material surface so that a monolayer of gas particles (molecules or atoms depending on the type of gas) is adsorbed onto the material surface. Irradiation of the material surface by a charged particle beam leads to the dissociation of the adsorbate, producing reactive fragments that react with the sample material to form volatile products that can be pumped away. A significant factor in the rate of material removal is the rate at which gas particles are adsorbed on the surface. If a charged particle beam, such as a focused ion beam (FIB), dwells too long in one location, all adsorbates will be dissociated or desorbed and the beam will begin to remove material by sputtering, with the resulting problem of material redeposition. While milling, the ion beam is typically scanned repeatedly over a rectangle in a raster pattern. As the beam completes a scan, the beam is typically delayed for a significant amount of time before beginning the next scan to provide time for additional gas particles to adsorb onto the surface before beginning a new raster. This increases processing time. High concentrations (high gas pressures) of the precursor gas are not generally helpful because only a relatively small number of particles, forming a monolayer on the surface, adsorb onto the material surface at a time.

A similar gas-assisted etching process employing long pulse and continuous wave lasers is known as photochemical etching. Photochemical Laser Etching (PLE) involves directing a beam at the workpiece surface with an energy level below the ablation threshold of the material being processed while the workpiece surface is exposed to a precursor gas. Instead of removing the material by the very rapid process of thermal ablation described above, the laser only provides energy to the adsorbed gas particles causing the formation of a volatile compound that chemically etches the surface. While PLE does prevent redeposition artifacts, the material removal rate using this process is a fraction of the rate using thermal ablation.

Laser-assisted chemical etching (LCE) is another well known technique combining nanosecond lasers and reactive gasses to etch certain substrates, such as silicon, in the presence of a high-pressure gas, such as chlorine. Such a process is described, for example, by Daniel Ehrlich et al., *Laser Etching for Flip-Chip De-Bug and Inverse Stereolithography for MEMS*, SOLID STATE TECH., Jun. 2001, pp. 145-150 ("Ehrlich"). In the process described by Ehrlich, however, the laser is not used to ablate the sample surface; rather the laser is used to heat the silicon until it becomes molten. The molten silicon then reacts with the chlorine gas to etch the silicon. According to Ehrlich, as the chlorine reactant pressure is increased, etching (directly proportional to the reaction flux) increases linearly for a time then saturates as the nonlinear effect of gas diffusion limits long-range transfer of reactant gas due to the formation of a depleted "boundary layer." As a result, etching rates (without redeposition) can only be increased to a relatively low rate when compared to the removal rates that are possible using thermal ablation.

What is needed is an improved method for laser processing that prevents material redeposition during laser ablation but allows material to be removed at a high rate.

SUMMARY OF THE INVENTION

An object of the invention is to provide an improved method for laser processing that prevents material redeposition during laser ablation but allows material to be removed at a high rate.

A preferred embodiment includes performing laser ablation in a chamber filled with high pressure precursor (etchant) gas so that sample particles ejected during laser ablation will react with the precursor gas in the gas atmosphere of the sample chamber. When the ejected particles collide with precursor gas particles, the precursor is dissociated, forming a reactive component that binds the ablated material. In turn, the reaction between the reactive dissociation by-product and the ablated material forms a new, volatile compound that can be pumped away in a gaseous state rather than redepositing onto the sample.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF PREFERRED EMBODIMENTS

Although those of ordinary skill in the art will readily recognize many alternative embodiments, especially in light of the illustrations provided herein, this detailed description is exemplary of the preferred embodiments of the present invention, the scope of which is limited only by the appended claims.

As described above, laser ablation is capable of rapidly removing a massive amount of material from a surface. Much of the material removed, however, is redeposited onto the surface, reducing the quality of the cut and decreasing cutting efficiency. As also described above, gas-assisted milling is used to reduce or eliminate redeposition in charged particle beam systems. Similar techniques have been employed with laser beam systems. Due to the relatively massive amount of material removed during laser ablation, the familiar mechanism of gas-assisted milling using a focused ion beam is of little or no benefit. A monolayer of an etchant gas adsorbed onto the sample surface is removed so quickly by the laser that its effect on the milling rate is only marginal. Once the etchant gas is depleted, the laser will begin to ablate the surface as described above, resulting in significant material redeposition.

Applicants have discovered that, instead of relying on the gas adsorbed onto the surface, it is possible to fill the sample chamber with a great enough pressure of etchant gas that the ejected particles themselves will react with the etchant gas in the gas atmosphere of the sample chamber. Rather than having the reaction limited to the surface layer of the sample and a monolayer of gas adsorbed on the surface, the present invention allows a relatively large volume of sample material to be ejected from the sample and to react with the high concentration of precursor gas in the sample chamber. This allows for an enormous increase in the material removal rates (due to laser ablation) while eliminating the problems associated with material redeposition.

Figure 1:
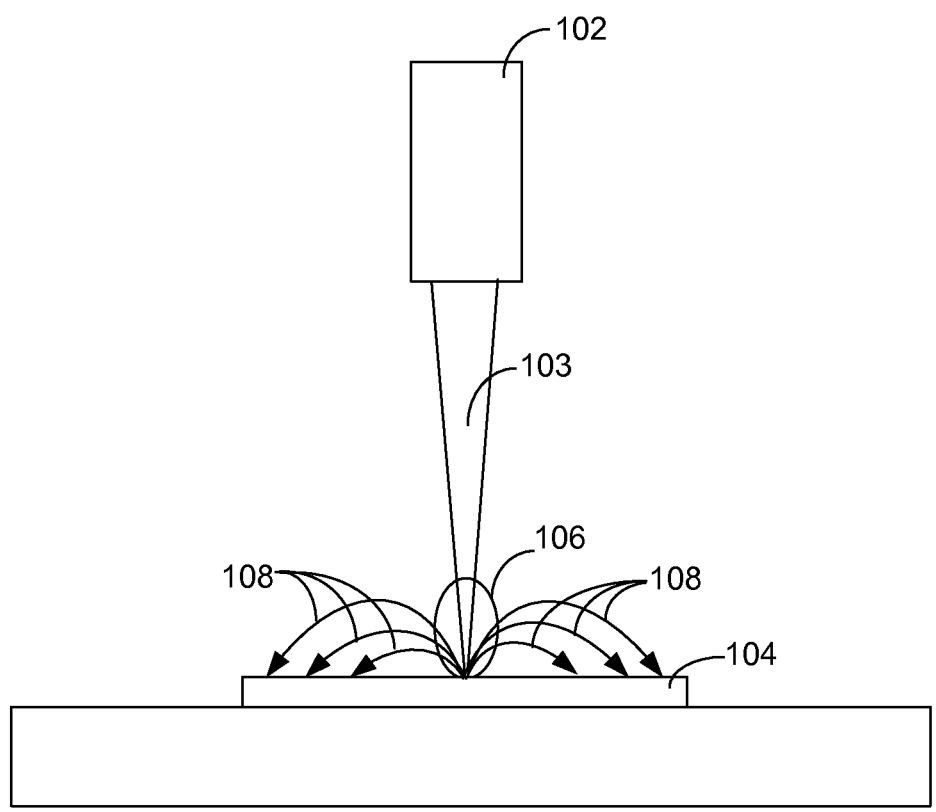
FIG. 1 shows a beam system for use with the present invention.
Figure 2:
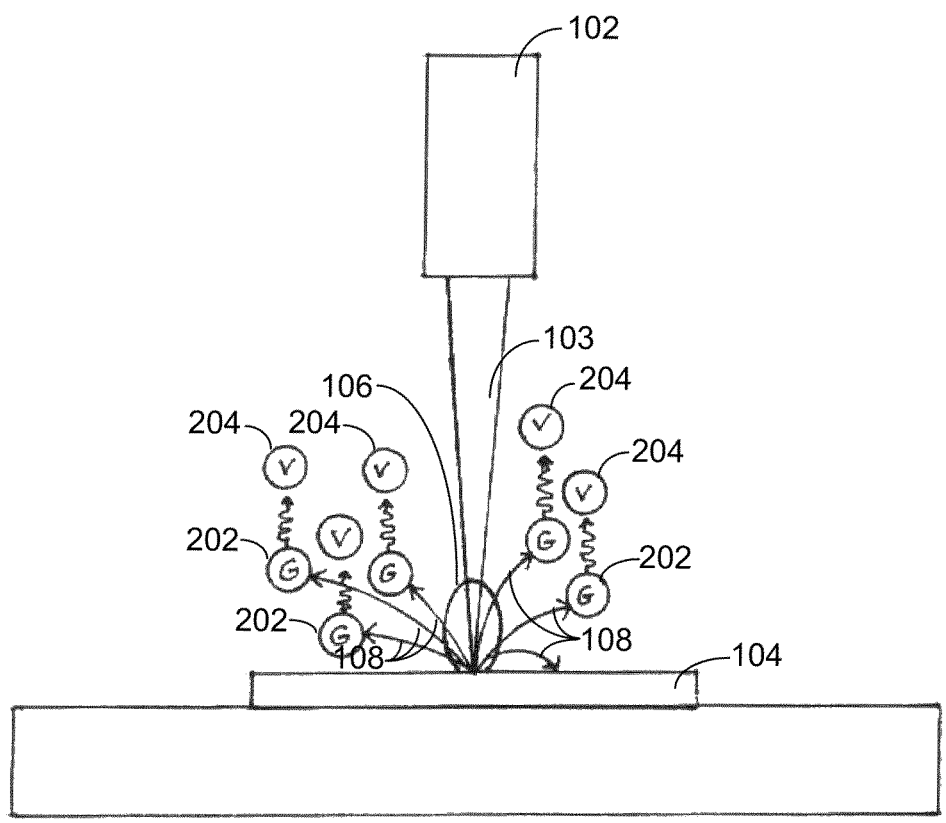
FIG. 2 s a schematic illustration of a femtosecond laser ablating a surface according to the present invention.

FIG. 2 is a schematic illustration of a femtosecond laser ablating a surface according to the present invention. In prior art gas-assisted etching in a charged particle beam system, the sample chamber is maintained at a vacuum pressure of between approximately $1.33 \times 10^{-5}$ Pa ($1 \times 10^{-7}$ Torr) and $6.66 \times 10^{-2}$ Pa ($5 \times 10^{-4}$ Torr). Once the etch-assisting gas is used, the chamber background pressure may rise, typically to about $1.33\times10^{-3}$ Pa ($1\times10^{-5}$ Torr). In contrast, the pressure of the precursor gas inside the sample chamber 140 of FIG. 2 during laser ablation is preferably much higher. As described in greater detail below, the actual pressure used will depend upon the gas species used but the pressure is preferably high enough that most of the ejected particles 108 will collide with gas particles 202 (molecules or atoms) in the atmosphere of the sample chamber 140. During laser ablation, the gas precursor is dissociated by some combination of the hot ablated material, ejected photoelectrons from the sample, high energy photons (X-rays) characteristic of ultra-fast pulsed laser ablation, or the field generated by the focused laser beam. The reactive dissociation byproduct then binds to the ablated material, forming a new, volatile compound 204 which can be pumped away in gaseous form rather than redeposited on the sample.

Thus, the reaction of the sample material is with gas particles in the gas phase, rather than gas particles adsorbed onto the sample surface. Even though some of the gas particles may be adsorbed onto the sample surface, the amount of material removed during the laser ablation is so great that the adsorbed particles would only be able to volatilize a small fraction of the material being removed. Instead of keeping the precursor gas volume low, as in typical gas assisted etching, preferred embodiments of the present invention make use of a precursor gas at a much higher pressure so that the ejected material will be more likely to collide with the gas particles and produce the desired volatile by-product.

Persons of skill in the art will recognize that, even in prior art gas-assisted etching, some relatively small numbers of substrate particles (molecules or atoms) may escape from the surface of the substrate and react with gas particles in the atmosphere of the vacuum chamber. As is well-known in the art, all solids exhibit a vapor pressure, although this vapor pressure is typically extremely low. In prior art gas-assisted etching, the rate at which substrate particles escape the surface and react with gas particles in the chamber atmosphere will be so low as to be inconsequential in relation to the rate at which substrate particles react with adsorbed gas particles on the substrate surface.

In contrast, according to the present invention, the reaction between the substrate and the etching gas particles takes place primarily in the atmosphere of the chamber rather than on the surface. In other words, most of the sample material is first ejected from the sample surface via laser ablation and then reacts with gas particles in the atmosphere of the sample chamber. Although some material on the sample surface will typically also react with the etching gas, more of the sample material removed is volatilized in the gas atmosphere, than is volatilized on the sample surface. This is because the present invention is not limited to the reaction between the substrate particles on the surface and the monolayer of etchant gas that comes into contact with those surface particles. Instead, the laser ablation of the surface and the use of higher pressures of etchant gas allows for a much larger volume of the sample to react with the etchant gas at the same time. As used herein, the phrase "volatilized in the gas atmosphere" (or in the vacuum chamber atmosphere) will be used to refer to sample material that is ejected from the sample surface and reacts to form a volatile compound instead of redepositing onto the sample (or depositing onto another surface such as the system components). According to preferred embodiments of the present invention, more than 80% of the sample material removed is volatilized in the gas atmosphere rather than on the sample surface; more preferably, more than 90% of the sample material removed is volatilized in the gas atmosphere.

Further, the formation of an adsorbed monolayer of etching gas on a sample surface, as taught by the prior art, is temperature dependent. Sticking coefficient is the term used in surface physics to describe the ratio of the number of adsorbate atoms (or molecules) that do adsorb, or "stick," to a surface to the total number of atoms that impinge upon that surface during the same period of time. Sometimes the symbol $S_c$ is used to denote this coefficient, and its value is between 1.00 (all impinging atoms stick) and 0.00 (none of the atoms stick). The coefficient is inversely proportional to the exponential of the temperature. Above a certain temperature (which varies for each type of gas) the sticking coefficient of the gas will reach 0.00 and none of the gas particles will be adsorbed onto the sample surface. Instead, all of the gas particles will be driven into the atmosphere. Prior art gas-assisted etching will not work under such conditions. The present invention, however, can still be used to etch such a sample without significant redeposition because the ejected material is volatilized in the gas atmosphere rather than on the surface.

Persons of ordinary skill in the art will recognize that a higher precursor gas pressure will make it more likely that the ejected particles will collide with gas particles and produce the desired volatile gas by-product. Persons of ordinary skill will be able to easily determine the lowest gas pressure which produces a suitable decrease in redeposition. Preferably, the sample to be laser ablated is placed in an atmosphere of a precursor gas having a pressure typically between 13 Pa (0.1 Torr) and 6666 Pa (50 Torr), and more typically between 133 Pa (1 Torr) and 1333 Pa (10 Torr). In some preferred embodiments, a high enough gas pressure can be used so that substantially all of the ejected material is volatilized rather than redeposited. In this context, the phrase "substantially all" is used to indicate that the great majority of the ejected material is volatilized so that none or only an insignificant about of the sample material is redeposited. Preferably, more than 80% of the ejected material is volatilized; more preferably, more than 90% is volatilized.

Likewise, the phrase "a significant reduction in redeposition" or similar phrasing will be used to compare redeposition using laser ablation without a precursor gas to the much smaller amount of redeposition, especially in the milled area, that results from laser ablation in the presence of a precursor gas at a suitable pressure. In preferred embodiments, redeposition in the sample area will be reduced by more than 50%; more preferably by more than 80%; and even more preferably by more than 90%.

While in general higher pressures are more desirable, there are factors that may limit the desirable precursor gas levels. In other preferred embodiments, a desired gas pressure could result in a smaller percentage of ejected material being volatilized in the gas atmosphere. For example, in some applications, a smaller reduction in redeposition could be acceptable—such as 70% or even 50% reduction in redeposition as compared to ablation without using the precursor gas. Obviously, higher gas pressures will physically use more gas, raising material and storage costs. For such applications, the use of a lower concentration of etching gas, which would serve to lower material and storage costs, might be desirable.

Further, some commonly used precursor gasses have vapor pressures that limit the concentrations that can be used. $XeF_2$, for example, has a vapor pressure of approximately 533.2 Pa (4 Torr) at room temperature. Consequently, where $XeF_2$ is used as a precursor gas, it would be desirable to keep the pressure below 533.2 Pa to prevent the gas from condensing. Other precursor gases can be used at pressures up to atmospheric pressure or beyond, although as described below, a higher pressure will take longer to pump down for charged particle beam imaging or processing. Various precursor gases could be used, depending on the material being processed, for example, $Cl_2$, $I_2$, $SiF_4$, $CF_4$, $NF_3$ for Si, $N_2O$, $NH_3+O_2$, or $NO_2$ for Cu.

Also, for precursor gases with a lower ionization energy, higher gas pressures could cause gas ionization by a laser beam of sufficiently high energy, which could interfere with the laser energy reaching the workpiece surface thus slowing down the ablation process. Where the precursor gas has an ionization energy above the energy of the unfocused laser beam, however, even at higher pressures the precursor gas will not react with the beam at all. The focused beam will dissociate gases with high ionization energies due to nonlinear effects resulting from the extremely high field generated by ultra-short pulses.

Figure 3:
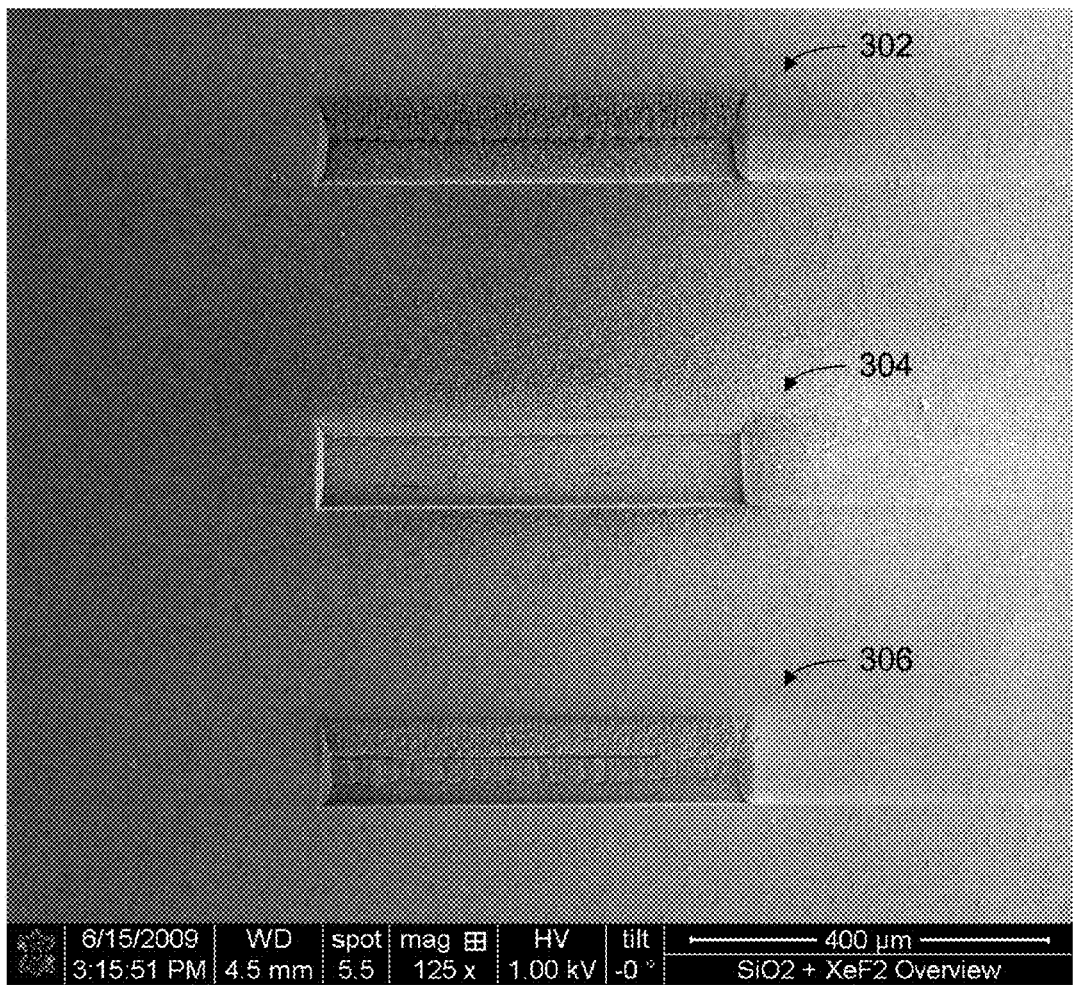
FIG. 3 is a photomicrograph showing the results of laser ablation under three different gas pressures according to a preferred embodiment of the present invention.

FIG. 3 illustrates the effects of using a precursor gas with laser ablation in accordance with a preferred embodiment of the present invention. The three rectangular trenches (302, 304, and 306) shown in FIG. 3 were machined in a sample of $SiO_2$ using a 150 femtosecond Ti:Sapphire laser having a central wavelength of 775 nm. Trench 302 was milled in a typical high vacuum of approximately $1.33\times10^{-1}$ Pa ($1\times10^{-3}$ Torr). Significant redeposition artifacts are clearly visible on the sides and floor of box 302. Trench 304, however, was milled after the introduction of $XeF_2$ gas at a pressure of 266 Pa (2 Torr). Redeposition artifacts are greatly reduced in trench 304. The sides of trench 304 appear substantially vertical, unlike the heavily sloped sidewalls of trench 302. Finally, trench 306 was milled after the $XeF_2$ gas had been removed and the chamber pumped back down to a pressure of approximately $1.33\times10^{-1}$ Pa ($1\times10^{-3}$ Torr). Not surprisingly, trench 306 shows the same redeposition artifacts seen in trench 302.

Note that the precursor gas pressure used while milling 304 would be close to optimal for many uses. While there does appear to be some redeposition on the substrate surface around trench 304, there is a much smaller amount of redeposited material inside the sample area being milled. A higher precursor gas pressure might result in less total redeposition, but because the redeposition is already outside the sample area, for many uses the additional material costs for a greater amount of precursor gas would not be justified.

FIGS. 4A-4D illustrate the results of laser ablation under three different precursor gas pressures in accordance with the present invention. For all images, the average power of the delivered laser beam was 1.8 mW at 1 kHz, or 1.8 µJ per pulse. Features made in the substrate by the focused laser beam were measured to be 4.25±0.25 µm for n>1000 pulses. The laser beam was directed onto the substrate at normal incidence and the stage was scanned in the X (horizontal) direction at a constant velocity of 50 µm/sec. Between each horizontally scanned line, the stage was stepped 1 µm in the Y (vertical) direction and the scan direction reversed. A total of 100 lines were machined for a final pit having nominal dimensions of 100 µm×100 µm. In all images, the scan started in the upper left-hand corner, proceeded horizontally, and ended in the lower left hand corner.

Figure 4A:
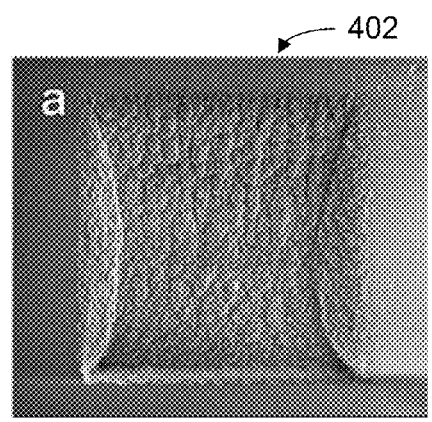
FIGS. 4A-D are photomicrographs showing the results of laser ablation for boxes milled in a substrate at different etchant gas pressures according to a preferred embodiment of the present invention.

FIG. 4A shows a rectangular hole milled in the substrate using laser ablation at a high vacuum (approximately $5.9\times10^{-3}$ Pa) without using a precursor gas. As seen in the image, a significant amount of the ablated material redeposited into the hole 402. FIG. 4A illustrates how material ejected during ablation redeposits in a radial distribution with little variation through $2\pi$ radians. Material ejected in the direction of the scan is removed as the scan progresses, and accumulates preferentially at the trailing edge of the scan pattern. Thus, the redeposition seen in FIG. 4A is most pronounced at the top edge and almost completely absent from the bottom edge of the ablation pit.

Figure 4B:
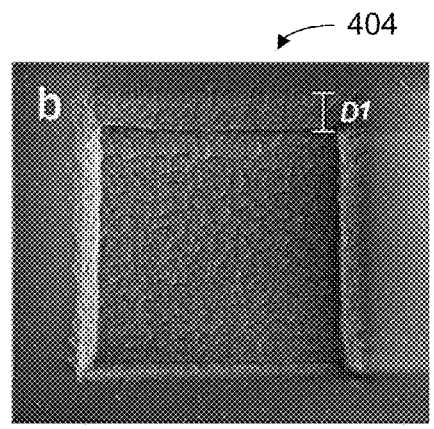
Figure 4C:
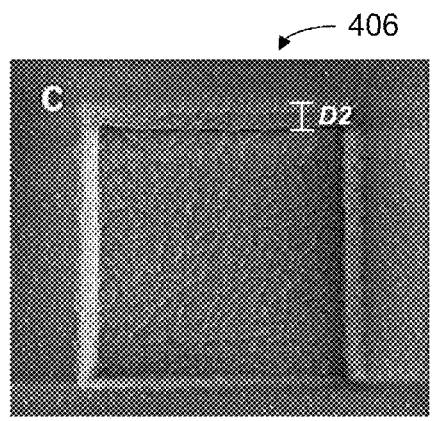
Figure 4D:
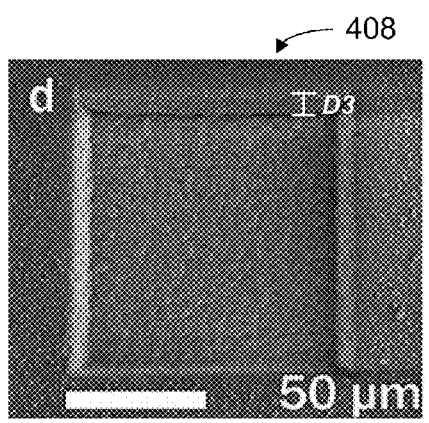

FIGS. 4B-4D show rectangular holes milled in the substrate using laser ablation using $XeF_2$ as a precursor gas at pressures 67, 267, and 533 Pa, respectively. As clearly illustrated by these images, the presence of $XeF_2$ results in a significant reduction of redeposited material. The bottom and sidewalls of the milled holes of FIGS. 4B-4D are not significantly distorted by recast material, in contrast to the hole machined in high vacuum as shown in FIG. 4A.

The distance D at the upper corner of FIGS. 4B-4D is used as a measure of redeposition. The apparent thickness (D1, D2, and D3 respectively) of the trailing edge of the scan pattern (i.e., top edge of each hole) can be used as an approximate measure of the extent of redeposition. In the images, D is seen to decrease with increasing $XeF_2$ pressure. The values of D1 (FIG. 4B), D2 (FIG. 4C), and D3 (FIG. 4D) are 10.34, 6.85, and 5.83 µm, respectively. This decrease is attributed to a corresponding increase in the amount of ejected material converted to volatile species such as $SiF_x$ and $O_2$ during ablation, and the subsequent removal of these gas molecules by the pumping system.

As discussed above, at lower pressures of $XeF_2$ the methods described herein will still result in a significant reduction in redeposition (due to volatilization of the ejected sample material in the gas atmosphere) but the reduction will be lower. For example, if the pressure of $XeF_2$ is reduced from 266 Pa (2 Torr) to 66 Pa (0.5 Torr) or even 33 Pa (0.25 Torr), the amount of sample volatilized in the gas atmosphere might be reduced by 10% or 20%. In other words, the reduction in redeposition scales with the precursor gas pressure.

Figure 5:
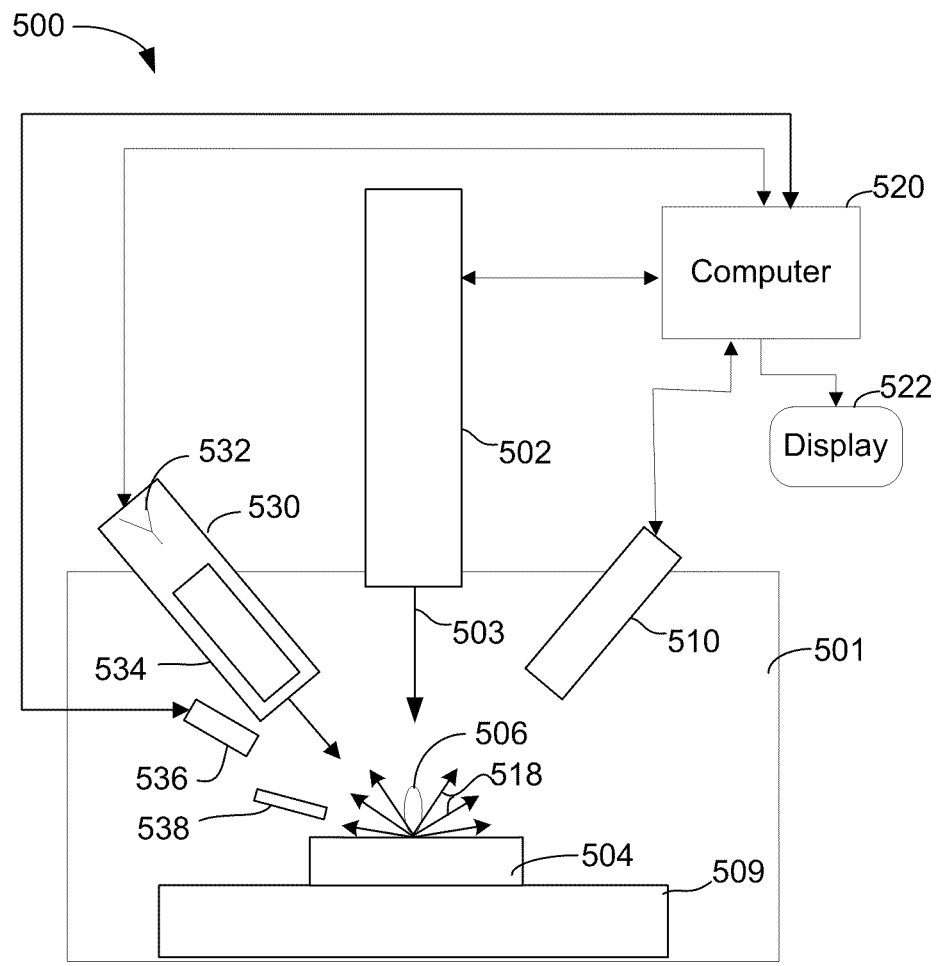
FIG. 5 shows a beam system for use with the present invention.

FIG. 5 shows a system 500 for use with a preferred embodiment of the present invention that combines a laser with a charged particle beam for monitoring the ablation process or for further material processing. A laser 502 directs a beam 503 to a sample 504. Sample 504 may include, for example, a single crystal, Z-cut $SiO_2$ substrate. Laser 502 is preferably capable of being operated at a fluence greater than the ablation threshold of the material being machined. Embodiments of the invention could use any type of laser, now existing or to be developed, that supplies sufficient fluence. A preferred laser provides a short, that is, nanosecond to femtosecond, pulsed laser beam. Suitable lasers include, for example, a Ti:Sapphire oscillator or amplifier, a fiber-based laser, or a ytterbium or chromium doped thin disk laser.

For example, a preferred laser system may include a Ti:Sapphire chirped pulse amplification system capable of delivering 150 fs, 1 mJ pulses with a center wavelength of 775 nm, and at a repetition rate of 1 kHz for a total average power of 1 W. Active power modulation is preferably achieved by a rotating half waveplate and a fixed linear polarizer. A neutral density filter preferably provides further attenuation and an iris is used to adjust the beam diameter. The beam is preferably focused onto the substrate by an infinity corrected 20× microscope objective with an NA of 0.40 such as one available, for example, from Mitutoyo America Corporation. Preferably, average power readings of the beam are made using a silicon detector located between the microscope objective lens and the specimen chamber. In one preferred embodiment, the beam enters the chamber through an O-ring sealed, 5 mm thick, BK7 glass optical window. A chamber for use in one preferred embodiment has a base pressure of approximately $5\times10^{-3}$ Pa and employs a heater (although not necessary), thermocouple, and leak valves to control substrate temperature and gas pressure. Pressure is preferably measured by gas species independent capacitance manometers.

Sample 504 is typically positioned on a precision stage 509, which preferably can translate the sample in the X-Y plane, and more preferably can also translate the work piece in the Z-axis, as well as being able to tilt and rotate the sample for maximum flexibility in fabricating three dimensional structures. The stage may also be a heated stage. System 500 optionally includes one or more charged particle beam columns 530, such as an electron beam column, an ion beam column, or both, which can be used for imaging the sample to monitor the laser ablation process for other processing or imaging tasks. Charged particle beam 530 typically includes a source 532 of charged particles; a focusing column 534 for forming a beam of charged particles from the source of charged particles and for focusing and scanning the beam of charged particles onto the substrate surface; a secondary particle detector 536, typically a scintillator-photomultiplier detector, for forming an image of the sample 504; and a gas injection 538 system for supplying a precursor gas that reacts in the presence of the charged particle beam. System 500 may also include an atomic force microscope (ATM) (not shown).

Sample chamber 501 preferably includes one or more gas outlets for evacuating the sample chamber using a turbomolecular and mechanical pumping system under the control of a vacuum controller. Sample chamber 501 also preferably includes one or more gas inlets through which gas can be introduced to the chamber at a desired pressure. In a preferred embodiment, before the laser ablation is performed, sample chamber 501 is first evacuated to a pressure of $1.33 \times 10^{-1}$ Pa ($1 \times 10^{-3}$ Torr) or less. A precursor gas is then introduced until the pressure in the chamber reaches some predetermined value. For example, $XeF_2$ could be introduced until the pressure in the sample chamber reaches at least 266 Pa (2 Torr); more preferably, the $XeF_2$ pressure will be increased until the pressure in the sample chamber reaches 66.6 to 133.3 Pa (0.5-1.0 Torr).

Laser ablation is then performed by directing the laser toward the substrate at an area to be micromachined. The ablation threshold is an intrinsic property of the substrate material, and skilled persons can readily determine empirically or from the literature the ablation threshold for various materials. A silicon substrate, for example, has a single pulse ablation threshold of about 170 mJ/cm2, and so the laser fluence should preferably be just above this value for micromachining silicon in accordance with the invention. A preferred laser beam has energy in the range of 10 nJ to 1 mJ, and a fluence in the range of 0.1 J/cm2 to 100 J/cm2. In one preferred embodiment for milling a silicon substrate, the laser beam has a fluence of 190 mJ/cm2, a pulse duration of 150 femtoseconds, and a spot size of 2 μm. In another embodiment, a laser beam has a pulse energy of 50 nJ and a fluence of 0.4 J/cm2.

As described above, the actual pressure of the precursor gas will depend upon the gas species used but the pressure will preferably be high enough that substantially all of the ejected particles will collide with gas particles in the atmosphere of the gas chamber thus generating a chemically active species that volatilizes the ejected material in flight as it leaves the sample.

In the preferred embodiment of FIG. 5, when charged particle beam column 530 or secondary particle detector 536 are used, the substrate must be maintained in a vacuum. As described below, the precursor gas would be pumped out and the sample chamber restored to vacuum before the charged particle beam is employed. In some embodiments, detector 536 can be used to detect a secondary electron signal to form an image, which can be used to monitor the laser ablation process. A computer 520 controls the system 500 and a display 522 displays an image of the sample for the user. In some embodiments, an additional detector 510 detects emissions, such as x-rays or other photons from the sample 504 to determine when a machining process is complete. Endpointing processes for use with laser machining are described in U.S. Pat. App. No. 61/079,304 for Jul. 9, 2008, for "Method and Apparatus for Laser Machining," which is hereby incorporated by reference.

In addition to an improvement in cut quality via the reduction of redeposited material, the present invention has the added benefit of reducing contamination to system components (such as lenses and pole pieces). There are two mechanisms responsible for this effect. First, by combining with the reactive dissociation byproduct, much of the ablated material is volatilized and pumped away before being deposited on system components. Secondly, because of the relatively high gas pressures involved, the mean free path of the ablated material that does not react with the dissociation byproducts is reduced. As a result, the particles in question travel shorter distances before coming to rest, never coming into contact with system components. Evidence of this effect can be seen in the increased debris field around box 304 in FIG. 3.

One disadvantage of the apparatus of FIG. 5 is that the high gas pressure used during laser ablation is not suitable for use with a charged particle beam column, such as a typical dual beam system or SEM. In order to use the charged particle beam, for example, to monitor the material removal process, the sample chamber would have to be pumped out to a suitable vacuum. The higher the pressures used for the laser, the longer it will take to pump out the pressure to make use of the SEM or ion beams. The time required to pump out and re-pressurize the chamber would be significant.

Figure 6:
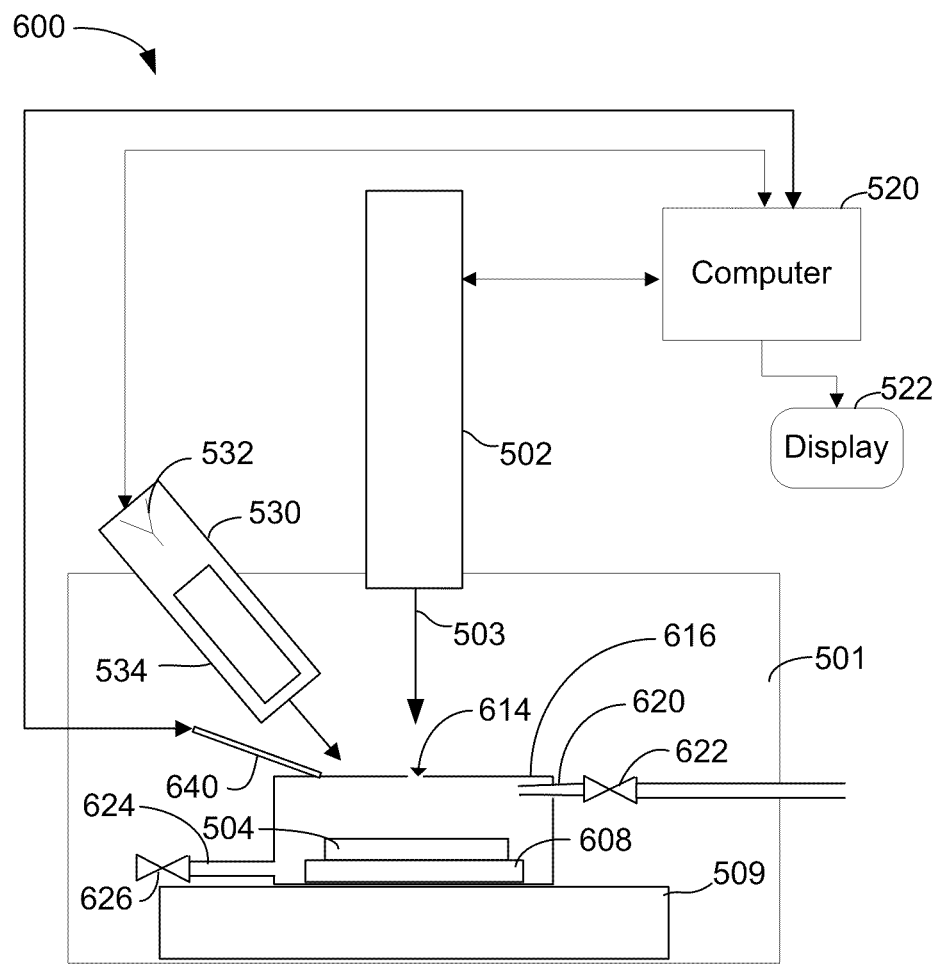
FIG. 6 shows a beam system using a smaller sample cell having a pressure limiting aperture for use with the present invention.

Instead of pressurizing the entire sample chamber with the precursor gas, in some preferred embodiments, the sample can be placed inside a smaller sample cell within the main sample chamber as described in U.S. patent application Ser. No. 12/525,908 for "High Pressure Charged Particle Beam System," filed Aug. 5, 2009, which is assigned to the assignee of the present invention and incorporated herein by reference. FIG. 6 shows a preferred embodiment of the present invention making use of such a sample cell.

Preferred embodiments of the invention use a cell in which a sample is positioned for charged particle beam processing. A pressure limiting aperture maintains a lower pressure outside of the cell. A cell can be positioned inside a conventional high vacuum SEM chamber to provide the capability of surrounding the sample with a higher pressure precursor gas atmosphere while maintaining a suitable vacuum inside the focusing column and main sample chamber. Gas particles scatter the primary electron beam, and so the pressure limiting aperture is positioned to minimize the distance that the electron beam travels in the high pressure region to reduce interference with the primary beam, while providing a sufficient travel distance for adequate gas amplification of the secondary electron signal, as described below.

The volume of the cell is typically significantly smaller than the volume of a typical prior art sample chamber, thereby reducing the quantity of precursor gas required to achieve a desired pressure for laser processing. Because the quantity of gas in the cell is relatively small, gas can be introduced, evacuated, and distributed within a cell more quickly than with a conventional sample chamber. Containing the gas within a cell protects the sample chamber and the electron focusing column from any adverse affects, such as corrosion, from processing gases, while the cell can be constructed from materials that will not be adversely affected by the gases. A cell can be disposable, which can be advantageous when an extremely reactive gas is used. Further, the use of a smaller sample cell within the main sample chamber has the added advantages of reducing overall gas consumption and protecting various system components from exposure to corrosive precursor gases and chemicals.

In the preferred embodiment of FIG. 6, system 600 includes laser 502 and charged particle beam 540. Sample cell 616 fits inside a larger sample chamber 401 and has a pressure limiting aperture (PLA) 614. The interior volume and surface area of the sample cell 316 are preferably small relative to the sample chamber 501.

System 600 also includes a sample cell gas inlet 620, an inlet leak valve 622, a sample cell gas outlet 624, and an outlet leak valve 626, which can be vented to the sample chamber 501 as shown, or to a roughing pump (not shown). This allows for rapid filing and evacuation of the cell. The pressure in the cell is a result of the flow rate into the cell through the gas inlet, the flow rate out of the cell through the gas outlet, and the leakage of gas through the PLA. Upper PLA 614 limits gas flow from the interior portion of sample cell 616 into the focusing column. PLA 614 preferably has a diameter of 800 micrometers or less.

A secondary electron detector 640 extends into sample chamber 501 and terminates at a position above PLA 614. The detector 640 is in the form of a needle and is suitable for use at relatively high pressures. In prior art High Pressure SEMs, secondary electrons are typically detected using a process known as "gas amplification," in which the secondary charged particles are accelerated by an electric field and collide with gas particles in an imaging gas to create additional charged particles, which in turn collide with other gas particles to produce still additional charged particles. This cascade continues until a greatly increased number of charged particles are detected as an electrical current at a detector electrode. In some embodiments, each secondary electron from the sample surface generates, for example, more than 20, more than 100, or more than 1,000 additional electrons, depending upon the gas pressure and the electrode configuration.

A housing stage 509, such as a conventional SEM sample stage, inside the sample chamber 501 is used for tilting or aligning cell 616 so that PLA 614 can be aligned with the axis of charged particle beam 530 or of laser beam 503. A cell sample stage 608 is also included inside the cell 616, for aligning a region of interest on sample 504 under the axis of electron beam 530 or of laser beam 503 for processing. While the embodiment of FIG. 6 allows the laser to enter the cell 616 through the PLA 614, in other embodiments, the laser beam could enter the cell 616 by other methods. For example, the laser could enter the cell through a window that is transparent to the laser wavelength. The window could be positioned, for example, on the top or side of the cell. The laser beam could also be routed into the cell using a photonic crystal fiber having negative group-velocity dispersion.

The use of a sample cell as shown in FIG. 6 would allow the use of a charged particle beam, such as an electron beam, to monitor the process of laser ablation in real time without having to pump down the entire sample chamber. In the preferred embodiment shown in FIG. 6, the SEM could still be used with the gas pressure in the sample cell as high as 2666 Pa (20 Torr). For gas pressures in the sample cell above 2666 Pa it would be preferable to pump down the gas pressure before activating the electron beam.

In another embodiment of the present invention, the beam can be focused above the sample in a precursor gas environment. The intense field produced by the focused laser pulse will dissociate gas phase precursor particles forming reactive byproducts. In a fashion similar to that described above, these byproducts combine with atoms in the substrate to form volatile compounds resulting in a photon induced chemical etch.

Although the description of the present invention above is mainly directed at a method of removing material from a sample by laser ablation while reducing redeposition, it should be recognized that an apparatus performing the operation of this method would further be within the scope of the present invention. Further, it should be recognized that embodiments of the present invention can be implemented via computer hardware or software, or a combination of both. The methods can be implemented in computer programs using standard programming techniques—including a computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

Further, methodologies may be implemented in any type of computing platform, including but not limited to, personal computers, mini-computers, main-frames, workstations, networked or distributed computing environments, computer platforms separate, integral to, or in communication with charged particle tools or other imaging devices, and the like. Aspects of the present invention may be implemented in machine readable code stored on a storage medium or device, whether removable or integral to the computing platform, such as a hard disc, optical read and/or write storage mediums, RAM, ROM, and the like, so that it is readable by a programmable computer, for configuring and operating the computer when the storage media or device is read by the computer to perform the procedures described herein. Moreover, machine readable code, or portions thereof, may be transmitted over a wired or wireless network. The invention described herein includes these and other various types of computer-readable storage media when such media contain instructions or programs for implementing the steps described above in conjunction with a microprocessor or other data processor. The invention also includes the computer itself when programmed according to the methods and techniques described herein.

Computer programs can be applied to input data to perform the functions described herein and thereby transform the input data to generate output data. The output information is applied to one or more output devices such as a display monitor. In preferred embodiments of the present invention, the transformed data represents physical and tangible objects, including producing a particular visual depiction of the physical and tangible objects on a display.

To the extent that any term is not specially defined in this specification, the intent is that the term is to be given its plain and ordinary meaning. The accompanying drawings are intended to aid in understanding the present invention and, unless otherwise indicated, are not drawn to scale.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. The terms "workpiece," "sample," and "specimen" are used interchangeably in this application. As used herein, the terms "ablation," "laser ablation," and "thermal ablation" is used to refer to material removal by means of laser radiation. "Photochemical laser etching" is used to refer to material removal by way of a laser activated chemical reaction. As used herein, the term "gas particles" will be used to refer to both molecules and atoms.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of removing material from a sample by laser ablation while reducing redeposition, the method comprising:
    providing an apparatus for laser micromachining having an airtight evacuable chamber for holding a sample, a source of a precursor gas, and a laser system for operating on the sample in the vacuum chamber, the laser system generating a pulsed laser beam having an energy great enough to ablate the sample;
    loading a sample into the vacuum chamber;
    filling the vacuum chamber with a desired concentration of precursor gas to form an atmosphere of precursor gas particles in the vacuum chamber around the sample, the precursor gas being a gas that will react with the sample material, when sufficient energy is provided to initiate said reaction, to form a volatile compound that will not redeposit onto the sample surface; and
    directing the laser at the sample to ablate the surface, the laser operated at a fluence greater than the ablation threshold of the sample material so that sample particles are ejected into the precursor gas atmosphere in the vacuum chamber; the laser providing sufficient energy to the ejected sample particles to initiate the reaction with the precursor gas particles; wherein directing the laser at the sample comprises directing the laser at the sample using a photonic fiber having negative group-velocity dispersion:
    wherein the desired concentration of precursor gas is high enough that that the volume of ejected particles that collide with and react with gas particles and are thereby volatilized is high enough to significantly reduce redeposition onto the sample.

2. The method of claim 1 further comprising providing a pump for removing gas from the vacuum chamber, and after ejected particles have reacted with the precursor gas to form a volatile compound, pumping that volatile compound out of the vacuum chamber in gaseous form.

3. The method of claim 1 in which at least 50% of the sample material ejected from the sample surface via laser ablation is volatilized in the vacuum chamber atmosphere so that it does not redeposit.

4. The method of claim 1 where the majority of material removed from the surface is ejected from the sample surface via laser ablation and volatilized in the vacuum chamber atmosphere so that it does not redeposit.

5. The method of claim 1 in which less than 10% of the material removed reacts with the precursor gas on the sample surface without being ejected into the vacuum chamber atmosphere by the laser ablation.

6. The method of claim 1 in which the desired pressure of precursor gas is from 13 Pa to 6666 Pa.

7. The method of claim 1 in which the precursor gas is $XeF_2$, $Cl_2$, $I_2$, $SiF_4$, $CF_4$, $NF_3$, $N_2O$, $NH_3+O_2$, $WF_6$, or $NO_2$.

8. The method of claim 1 in which the laser system comprises a pulsed laser beam.

9. The method of claim 1 in which the laser system comprises a nanosecond to femtosecond pulsed laser beam.

10. The method of claim 1 in which the laser system comprises a Ti: Sapphire laser, a fiber-based laser, or a ytterbium or chromium doped thin disk laser.

11. The method of claim 1 in which the laser system comprises a laser having an energy of 10 nJ to 1 mJ.

12. The method of claim 1 in which the laser system comprises a laser having fluence of 0.1 J/cm$^2$ to 100 J/cm$^2$.

13. The method of claim 1 in which the precursor gas is $XeF_2$.

14. The method of claim 1 wherein the laser providing sufficient energy to the ejected sample particles to initiate the reaction with the precursor gas particles comprises the laser providing sufficient energy to ablate the sample surface so that the gas precursor is dissociated by some combination of hot ablated material ejected from the sample by the laser, photoelectrons ejected from the sample by the laser, high energy photons (X-rays) ejected from the sample by the laser, or the field generated by the laser beam.

15. The method of claim 14 in which the precursor gas dissociates into at least a reactive dissociation byproduct which binds to the ablated material, forming a volatile compound which can be pumped away in gaseous form rather than redeposited on the sample.

16. The method of claim 1 wherein loading a sample into the vacuum chamber and filling the vacuum chamber with a desired concentration of precursor gas comprises loading the sample into a smaller sample cell within the main sample chamber and filling the sample cell with a desired concentration of precursor gas.

17. The method of claim 16 wherein directing the laser at the sample comprises directing the laser at the sample through a window in the sample cell that is transparent to the laser wavelength.

18. The method of claim 1 in which the laser system includes a lens.

19. The method of claim 1 further comprising evacuating the vacuum chamber to a pressure of less that $1.33 \times 10^{-1}$ Pa before filling the vacuum chamber with a desired concentration of precursor gas.

20. The method of claim 1 further comprising evacuating the vacuum chamber and employing a charged particle beam to process the target.

21. A method of removing material from a sample by laser ablation while reducing redeposition, the method comprising:
    providing an apparatus for laser micromachining having a vacuum chamber for holding a sample, a source of a precursor gas, and a laser system for operating on the sample in the vacuum chamber, the laser system generating a pulsed laser beam having an energy great enough to ablate the sample;

loading a sample into the vacuum chamber;

filling the vacuum chamber with a desired concentration of precursor gas to form an atmosphere of precursor gas particles in the vacuum chamber around the sample, the precursor gas being a gas that will react with the sample material, when sufficient energy is provided to initiate said reaction, to form a volatile compound that will not redeposit onto the sample surface; and directing the laser at the sample to ablate the surface, the laser operated at a fluence greater than the ablation threshold of the sample material so that sample particles are ejected into the precursor gas atmosphere in the vacuum chamber; the laser providing sufficient energy to the ejected sample particles to initiate the reaction with the precursor gas particles:

wherein the desired concentration of precursor gas is high enough that that the volume of ejected particles that collide with and react with gas particles and are thereby volatilized is high enough to significantly reduce redeposition onto the sample; and wherein directing the laser at the sample comprises directing the laser at the sample using a photonic fiber having negative group-velocity dispersion.

* * * * *